US012586948B2

(12) United States Patent
Tay et al.

(10) Patent No.: US 12,586,948 B2
(45) Date of Patent: Mar. 24, 2026

(54) CABLE CONNECTOR ASSEMBLY AND A METHOD FOR ASSEMBLING THE CABLE CONNECTOR ASSEMBLY

(71) Applicant: Carrier Corporation, Palm Beach Gardens, FL (US)

(72) Inventors: Lian San Tay, Singapore (SG); Eng Huat Chua, Singapore (SG); Randy Heijmans, Hoogvliet (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 287 days.

(21) Appl. No.: 18/463,634

(22) Filed: Sep. 8, 2023

(65) Prior Publication Data

US 2024/0088599 A1 Mar. 14, 2024

Related U.S. Application Data

(60) Provisional application No. 63/374,921, filed on Sep. 8, 2022.

(51) Int. Cl.

| | |
|---|---|
| ***H01R 13/502*** | (2006.01) |
| ***H01R 13/52*** | (2006.01) |
| ***H01R 43/20*** | (2006.01) |

(52) U.S. Cl.

CPC ....... *H01R 13/502* (2013.01); *H01R 13/5202* (2013.01); *H01R 43/20* (2013.01)

(58) Field of Classification Search

CPC .. H01R 13/502; H01R 13/5202; H01R 43/20; H01R 4/36; H01R 13/465; H01R 13/59;

(Continued)

(56) References Cited

U.S. PATENT DOCUMENTS

| | | | |
|---|---|---|---|
| 3,041,575 | A | 6/1962 | Schneider |
| 3,290,064 | A | 12/1966 | Bush |

(Continued)

FOREIGN PATENT DOCUMENTS

| | | | |
|---|---|---|---|
| CA | 3111064 | A1 | 3/2020 |
| CN | 201130839 | Y | 10/2008 |

(Continued)

OTHER PUBLICATIONS

Extended European Search Report received for EP Application No. 23196317.4, mailed on Feb. 2, 2024, 12Pages.

*Primary Examiner* — Abdullah A Riyami
*Assistant Examiner* — Nader J Alhawamdeh
(74) *Attorney, Agent, or Firm* — Drew Folgmann

(57) ABSTRACT

A cable connector assembly is disclosed. The cable connector assembly includes a housing member having a first end and a second end defining a passage therebetween. The housing member includes a first engaging portion and a second engaging portion coaxially extending from the first end and the second end, respectively. The housing member is adapted to accommodate at least one terminal block to electrically connect a first cable and a second cable. Further, the cable connector assembly includes a first clamping member adapted to be partially inserted in the first engaging portion of the housing member and to coaxially align with the passage to accommodate insertion of the first cable therein. The first clamping member is adapted to elastically deform to clamp the first cable.

20 Claims, 11 Drawing Sheets

(58) Field of Classification Search
CPC .... H01R 13/5825; H01R 11/01; H01R 11/09; H01R 43/26; H02G 15/115; H02G 15/117; H02G 15/007; H02G 15/013
See application file for complete search history.

(56) References Cited

U.S. PATENT DOCUMENTS

| | | | | |
|---|---|---|---|---|
| 4,558,173 | A | 12/1985 | Gajajiva et al. | |
| 5,271,080 | A | 12/1993 | Hopper et al. | |
| 5,502,280 | A | 3/1996 | Rocci et al. | |
| 5,854,444 | A | 12/1998 | Fehlhaber | |
| 6,069,320 | A * | 5/2000 | Rocci | H02G 15/013 174/93 |
| 6,734,360 | B2 * | 5/2004 | Magno | H01R 4/643 174/84 R |
| 8,398,419 | B2 | 3/2013 | Coyle, Jr. | |
| 8,513,543 | B1 * | 8/2013 | Lin | H02G 15/013 174/656 |
| 9,178,303 | B2 | 11/2015 | Franke et al. | |
| 2008/0279506 | A1 | 11/2008 | Kerry et al. | |
| 2013/0081848 | A1 | 4/2013 | Wu et al. | |
| 2022/0006227 | A1 * | 1/2022 | Augdahl | H01R 13/5202 |
| 2024/0088599 | A1 * | 3/2024 | Tay | H02G 15/117 |

FOREIGN PATENT DOCUMENTS

| | | | |
|---|---|---|---|
| CN | 103620888 | A | 3/2014 |
| CN | 110875550 | A | 3/2020 |
| DE | 10008613 | C2 | 3/2002 |
| DE | 202016107070 | U1 | 1/2017 |
| DE | 202018104235 | U1 | 8/2018 |
| EP | 0841734 | A1 | 5/1998 |
| WO | 2018193399 | A1 | 10/2018 |

* cited by examiner

CABLE CONNECTOR ASSEMBLY AND A METHOD FOR ASSEMBLING THE CABLE CONNECTOR ASSEMBLY

FIELD OF THE INVENTION

The present disclosure relates to cable connectors and more particularly, to a cable connector assembly for coupling cables, in refrigeration containers, via a cable splicing process and a method for assembling the cable connector assembly.

BACKGROUND

Cable connectors, also known as splice kits, are generally deployed in various applications for electrically connecting two or more cables. Although, different splice kits are required for connecting cables having different operational and dimensional characteristics. For example, a splice kit designed for connecting optical cables might not be implementable for connecting cables having an Outer Diameter (OD) larger compared to the optical cables. Currently, in the application of container refrigeration, splice kits are available for connecting cables with large ODs, such as ODs larger than 11 mm.

However, such splice kits comprise a large number of sub-components which increases the overall complexity of the assembling process of such splice kits. Further, owing to a large number of components, the overall manufacturing cost of such a splice kit is substantially higher. Also, an overall length of such a splice kit is substantially larger due to the deployment of a large number of sub-components. Further, current splice kits do not provide reliable electrical connections and their overall durability is substantially low. Furthermore, such splice kits fail to provide sufficient watertight provisions, and therefore the electrical connection between the cables might be prone to moisture or any contaminant which results in the overall failure of such electrical connection. Therefore, there is a need for an improved splice kit/connector assembly for connecting cables.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a cable connector assembly is disclosed. The cable connector assembly includes a housing member having a first end and a second end defining a passage therebetween. The housing member includes a first engaging portion and a second engaging portion coaxially extending from the first end and the second end, respectively. The housing member is adapted to accommodate at least one terminal block to electrically connect a first cable and a second cable. Further, the cable connector assembly includes a first clamping member adapted to be partially inserted in the first engaging portion of the housing member and to coaxially align with the passage to accommodate insertion of the first cable therein. The first clamping member is adapted to elastically deform to clamp the first cable.

The cable connector assembly includes a second clamping member adapted to be partially inserted in the second engaging portion of the housing member and to coaxially align with the passage to accommodate insertion of the second cable therein. The second clamping member is adapted to elastically deform to clamp the second cable. Further, the cable connector assembly includes a first fastening member adapted to partially accommodate the first clamping member and to coaxially engage with the first engaging portion. The first fastening member is rotated with respect to the first engaging portion to axially move on the first engaging portion and to elastically deform the first clamping member to clamp the first cable. Further, the cable connector assembly includes a second fastening member adapted to partially accommodate the second clamping member and to coaxially engage with the second engaging portion. The second fastening member is rotated with respect to the second engaging portion to axially move on the second engaging portion and to elastically deform the second clamping member to clamp the second cable.

In one or more embodiments, an outer surface of each of the first engaging portion and the second engaging portion comprises a plurality of threads adapted to be engaged with internal threads of one of the first fastening member and the second fastening member, respectively.

In one or more embodiments, each of the first clamping member and the second clamping member comprises a mating portion adapted to be inserted within one of the first engaging portion and the second engaging portion, and a deformable portion extending coaxially from the mating portion and adapted to deformably clamp one of the first cable and the second cable. A diameter of the mating portion is less than a diameter of the deformable portion.

In one or more embodiments, a sealing ring is adapted to be accommodated in a circular groove formed on an outer surface of the mating portion.

In one or more embodiments, the mating portion is inserted within one of the first engaging portion and the second engaging portion in a manner that the sealing ring abuts an inner surface of one of the first engaging portion and the second engaging portion to define a seal between the housing member and one of the first clamping member and the second clamping member.

In one or more embodiments, the deformable portion comprises a plurality of longitudinal tabs adapted to be elastically deformed in a radial direction by one of the first fastening member and the second fastening member to clamp one of the first cable and the second cable, respectively.

In one or more embodiments, each of the first clamping member and the second clamping member comprises an opening extending from the mating portion to the deformable portion and adapted to receive one of the first cable and the second cable, respectively, therethrough.

In one or more embodiments, a first sealing grommet is adapted to be inserted within the opening of the first clamping member and to coaxially align with the deformable portion of the first clamping member, and a second sealing grommet adapted to be inserted within the opening of the second clamping member and to coaxially align with the deformable portion of the second clamping member.

In one or more embodiments, each of the first sealing grommet and the second sealing grommet comprises an outer surface adapted to abut the deformable portion, and an inner surface defining an opening adapted to receive one of the first cable and the second cable therethrough.

In one or more embodiments, the first sealing grommet and the second sealing grommet are adapted to be compressed by a plurality of longitudinal tabs of the deformable portion of the first clamping member and the second clamping member, respectively, to define a seal around each of the first cable and the second cable.

In one or more embodiments, each of the first fastening member and the second fastening member comprises a plurality of furrows formed on an outer surface of each of the first fastening member and the second fastening member.

In one or more embodiments, the plurality of furrows is adapted to enable gripping of each of the first fastening member and the second fastening member, and to allow gripping of a fastening tool to tighten each of the first fastening member and the second fastening member to the housing member.

In one or more embodiments, the at least one terminal block comprises a body having a plurality of cavities adapted to accommodate a plurality of terminal contacts to electrically connect the first cable with the second cable.

In one or more embodiments, the body comprises a stepped portion formed on an outer surface of the body, and is adapted to restrict a rotational movement of the body, with respect to the housing member, within the passage of the housing member, the body is adapted to be inserted in the housing member by aligning the stepped portion with a gauge formed on the housing member.

In one or more embodiments, the gauge is formed on an outer surface of the housing member to indicate a length of a cable jacket to be stripped from each of the first cable and the second cable, a length of a cable insulation to be stripped from each of the first cable and the second cable to electrically connect one of the first cable and the second cable with the at least one terminal block, and one of the first end and the second end through which the at least one terminal block to be inserted within the passage of the housing member.

In one or more embodiments, a distance of a tip of the gauge from the first end of the housing member indicates the length of the cable jacket to be stripped from each of the first cable and the second cable for electrically connecting the first cable with the second cable via the at least one terminal block, and a distance of a tail of the gauge from the first end of the housing member indicates the length of the cable insulation to be stripped from one of the first cable and the second cable for electrically connecting the first cable with the second cable via the at least one terminal block.

In one or more embodiments, the passage of the housing member comprises a first region adapted to receive the at least one terminal block through one of the first end and the second end, and a second region coaxial with respect to the first region. An inner diameter of the first region is greater than an inner diameter of the second region.

In one or more embodiments, a seat is defined between the first region and the second region, the seat is adapted to abut and axially align the at least one terminal block at a central position within the passage to restrict ingress of the at least one terminal block within the second region.

In another embodiment of the present disclosure, a method of assembling a cable connector is disclosed. The method includes disposing a first fastening member and a first clamping member on a first cable and a second fastening member and a second clamping member on a second cable. The method includes pulling one of the first cable and the second cable through a housing member of the cable connector. Further, the method includes fastening the first cable and the second cable to at least one terminal block. The method includes inserting the at least one terminal block within the housing member of the cable connector through one of a first end and a second end of the housing member. Further, the method includes sealably engaging the first clamping member and the second clamping member with a first engaging portion extending from the first end and a second engaging portion extending from the second end, respectively, of the housing member. Furthermore, the method includes engaging the first fastening member and the second fastening member with the first engaging portion and the second engaging portion, respectively. The method includes rotating each of the first fastening member and the second fastening member with respect to the first engaging portion and the second engaging portion, respectively, for deformably compressing the first clamping member to clamp the first cable and the second clamping member to clamp the second cable.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
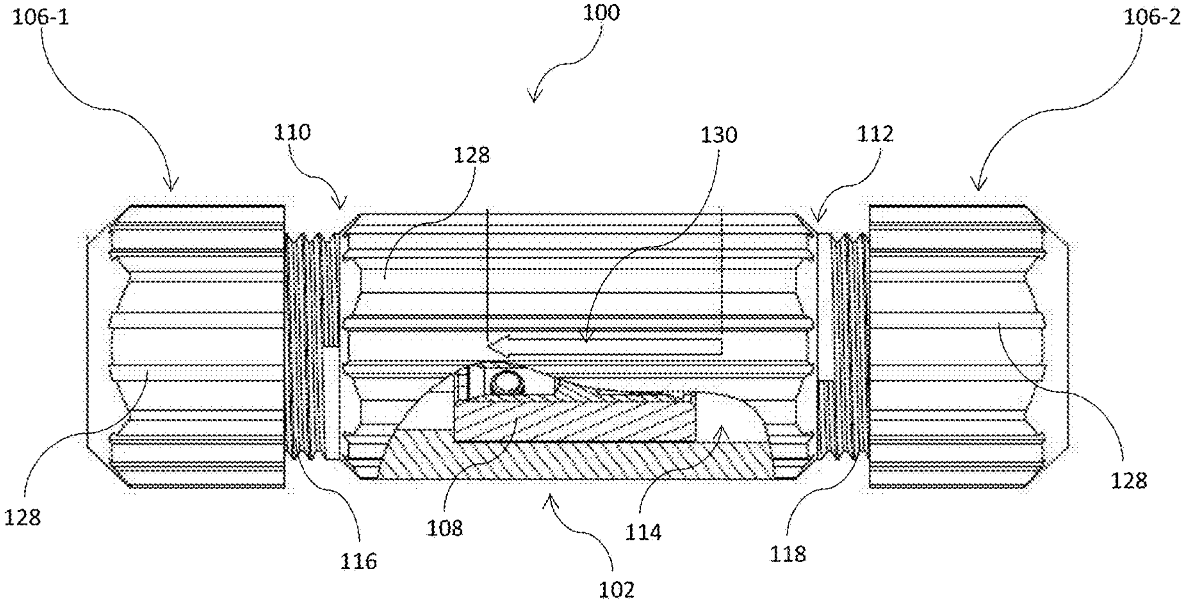
FIG. 1 illustrates a planar view of a cable connector assembly, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system and device, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the present invention will be described below in detail with reference to the accompanying drawings.

Figure 2:
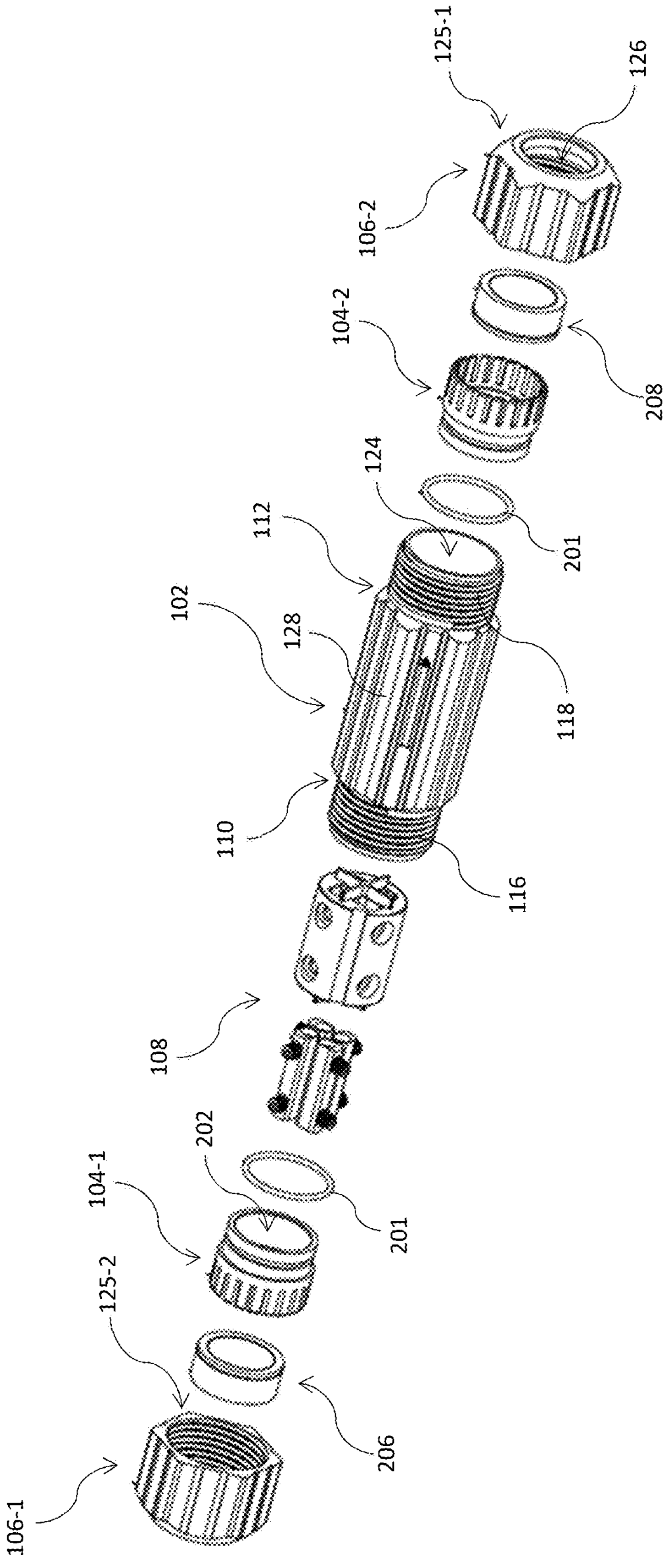
FIG. 2 illustrates an exploded view of the cable connector assembly, according to an embodiment of the present disclosure.

FIG. 1 illustrates a planar view of a cable connector assembly 100, according to an embodiment of the present disclosure. FIG. 2 illustrates an exploded view of the cable connector assembly 100, according to an embodiment of the present disclosure. In an embodiment, the cable connector assembly 100 may interchangeably be referred to as the connector assembly 100, without departing from the scope of the present disclosure.

Referring to FIG. 1 and FIG. 2, in the illustrated embodiment, the connector assembly 100 may include, but is not limited to, a housing member 102, a pair of clamping members 104, a pair of fastening members 106, and at least one terminal block 108. The housing member 102 may have an elongated structure and adapted to partially or entirely accommodate various sub-components, such as at least one terminal block 108 and the pair of clamping members 104, of the connector assembly 100. In the present embodiment, the at least one terminal block 108 may be referred to as the terminal block 108, without departing from the scope of the present disclosure.

In an embodiment, the housing member 102 may be embodied as a cylindrical structure. It should be appreciated by a person skilled in the art that the housing member 102 with the cylindrical structure as explained in the present disclosure should not be construed as limiting, and the housing member 102 may have a different structure, without departing from the scope of the present disclosure.

Referring to FIG. 1 and FIG. 2, the housing member 102 may include a first end 110 and a second end 112 defining a passage 114 therebetween. The passage 114 may be adapted to accommodate the terminal block 108 to electrically connect a first cable inserted through the first end 110 and a second cable inserted through the second end 112 within the housing member 102. In an embodiment, the first cable and the second cable may collectively be referred to as the cables, without departing from the scope of the present disclosure.

Figure 3:
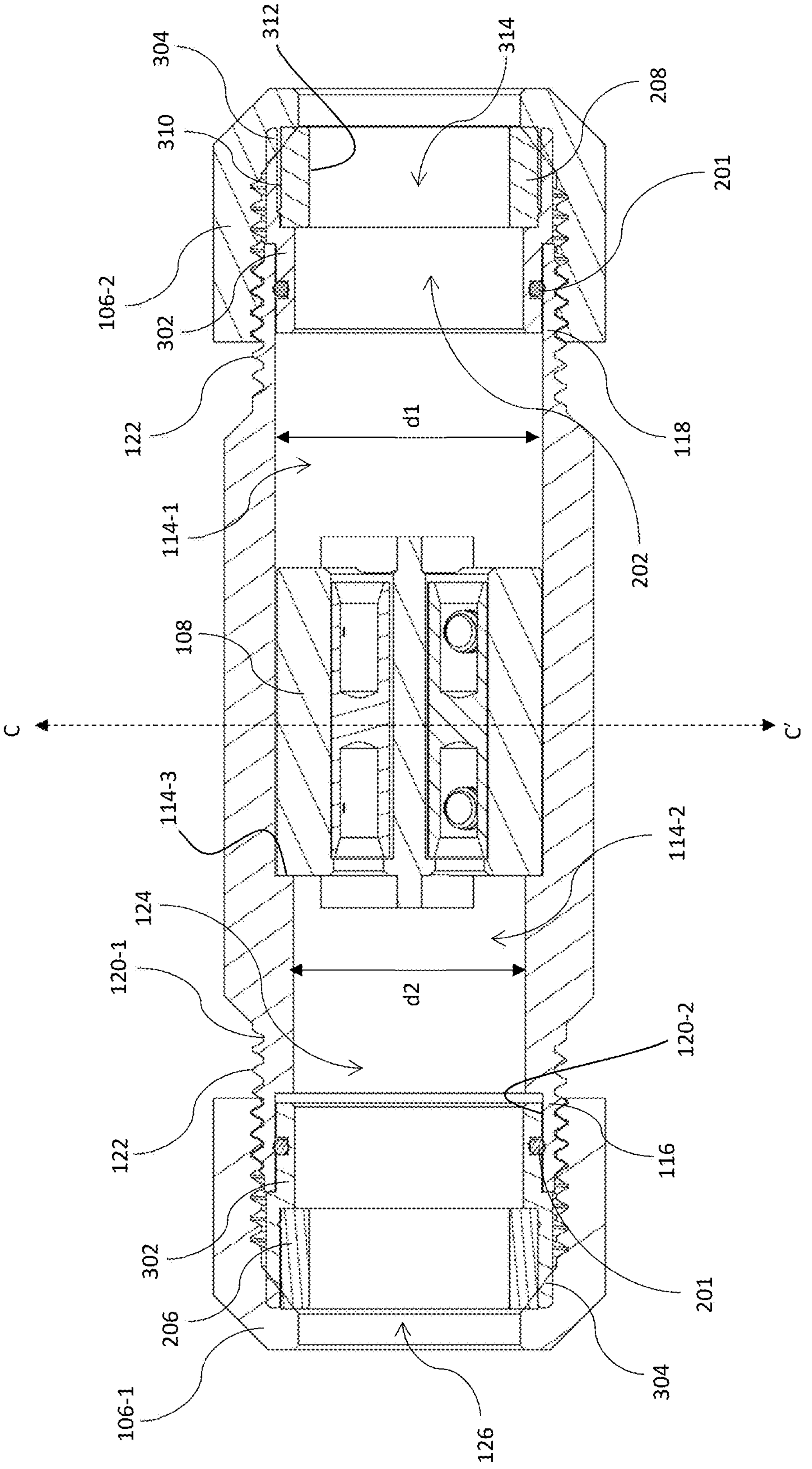
FIG. 3 illustrates a cross-sectional view of the cable connector assembly, according to an embodiment of the present disclosure.

FIG. 3 illustrates a cross-sectional view of the connector assembly 100, according to an embodiment of the present disclosure. Referring to FIG. 3, in the illustrated embodiment, the passage 114 of the housing member 102 may include, but is not limited to, a first region 114-1 and a second region 114-2. The first region 114-1 may be adapted to receive the terminal block 108 through one of the first end 110 and the second end 112 of the housing member 102. The second region 114-2 may be coaxially defined with respect to the first region 114-1. In an embodiment, an inner diameter 'd1' of the first region 114-1 may be greater than an inner diameter 'd2 of the second region 114-2.

Further, the passage 114 may include a seat 114-3 defined between the first region 114-1 and the second region 114-2. The seat 114-3 may be adapted to abut and axially align the terminal block 108 at a central position within the passage 114 to restrict ingress of the one terminal block 108 within the second region 114-2. In an embodiment, the central position may be referred to a position, within the passage 114, which is equally distant from the first end 110 and the second end 112 of the housing member 102.

In an embodiment, the terminal block 108 may interchangeably be referred to as the terminal block 108, without departing from the scope of the present disclosure. Constructional details of the terminal block 108 and details pertaining to the connection of the first cable with the second cable are explained in detail with respect to the description of FIGS. 5 and 6 of the present disclosure.

The housing member 102 may include, but is not limited to, a first engaging portion 116 and a second engaging portion 118 coaxially extending from the first end 110 and the second end 112, respectively. In an embodiment, each of the first engaging portion 116 and the second engaging portion 118 may be an integral part of the housing member 102. In an example, the housing member 102 with the first engaging portion 116 and the second engaging portion 118 may be formed by an injection molding process, without departing from the scope of the present disclosure. In an embodiment, the first engaging portion 116 and the second engaging portion 118 may be collectively referred to as the engaging portions 116, 118, without departing from the scope of the present disclosure.

Each of the engaging portions 116, 118 may include an outer surface 120-1 having a plurality of threads 122 and an inner surface 120-2 defining a conduit 124. Each of the engaging portions 116, 118 may be adapted to be engaged with one of the pair of fastening members 106 via the plurality of threads 122. In an embodiment, the conduit 124 may be coaxially defined with respect to the passage 114 of the housing member 102. The conduit 124 of each of the engaging portions 116, 118 may be adapted to partially receive at least one of the pair of clamping members 104.

Referring to FIG. 2, the pair of clamping members 104 may include a first clamping member 104-1 and a second clamping member 104-2. The first clamping member 104-1 may be adapted to be disposed at the first end 110 of the housing member 102. In an embodiment, the first clamping member 104-1 may be adapted to be partially inserted in the first engaging portion 116 of the housing member 102 and to coaxially align with the passage 114 to accommodate the insertion of the first cable therein.

Similarly, the second clamping member 104-2 may be adapted to be disposed at the second end 112 of the housing member 102. In an embodiment, the second clamping member 104-2 may be adapted to be partially inserted in the second engaging portion 118 of the housing member 102 and to coaxially align with the passage 114 to accommodate the insertion of the second cable therein.

The first clamping member 104-1 and the second clamping member 104-2 may be adapted to clamp the first cable and the second cable, respectively, and thereby restricting axial displacement of cables with respect to the housing member 102. In an embodiment, the first clamping member 104-1 may be adapted to elastically deform to clamp the first cable. Similarly, the second clamping member 104-2 may be adapted to elastically deform to clamp the second cable.

Constructional details of the clamping member, such as the first clamping member 104-1 and the second clamping member 104-2, are explained in the subsequent sections of the present disclosure.

Figure 4:
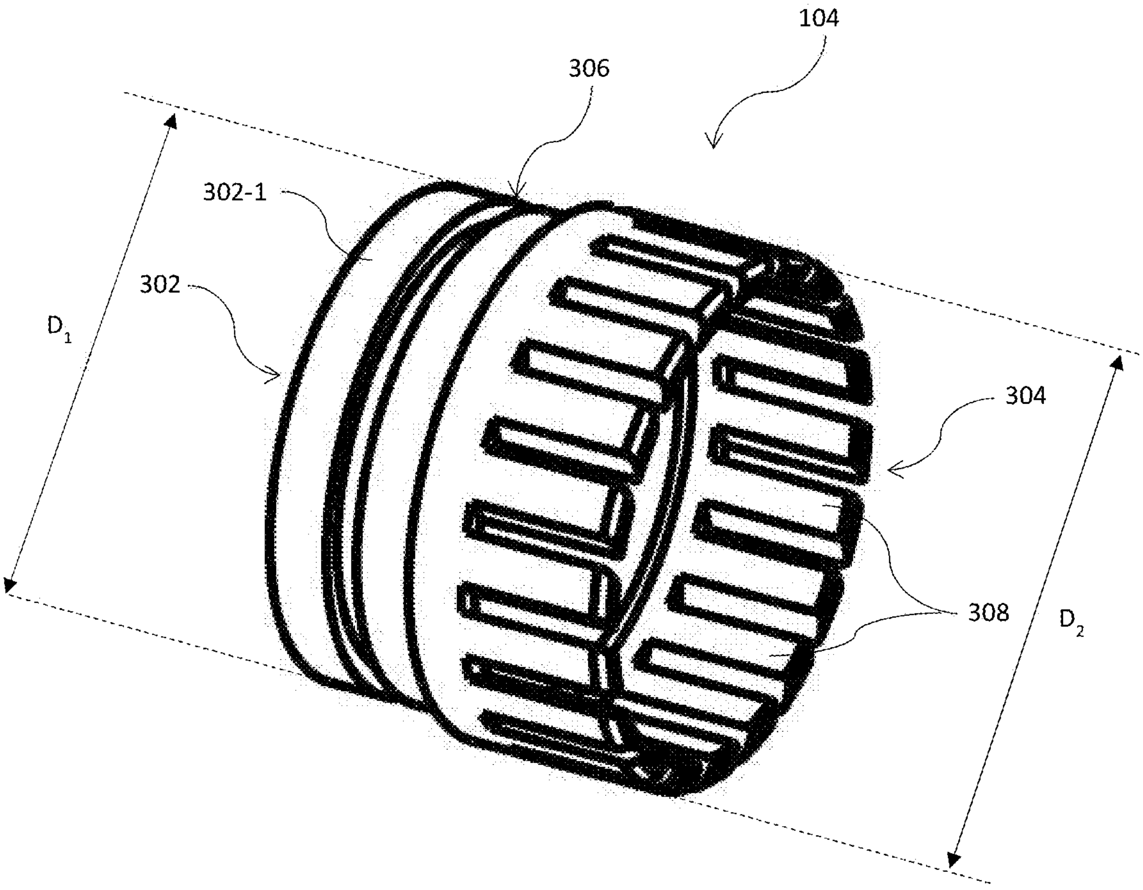
FIG. 4 illustrates a perspective view of a clamping member of the cable connector assembly, according to an embodiment of the present disclosure.

FIG. 4 illustrates a perspective view of the clamping member of the connector assembly 100, according to an embodiment of the present disclosure. In an embodiment, the first clamping member 104-1 and the second clamping member 104-2 may collectively be referred to as the clamping members 104-1, 104-2, without departing from the scope of the present disclosure. Referring to FIG. 4, each of the clamping members 104-1, 104-2 may include, but is not limited to, a mating portion 302 and a deformable portion 304 distal to the mating portion 302. In an embodiment, a diameter '$D_1$' of the mating portion 302 may be less than a diameter '$D_2$' of the deformable portion 304.

The mating portion 302 may be adapted to be inserted within one of the engaging portions 116, 118. In particular, the mating portion 302 of the first clamping member 104-1 may be inserted within the conduit 124 of the first engaging portion 116. Similarly, the mating portion 302 of the second clamping member 104-2 may be inserted within the conduit 124 of the second engaging portion 118. In an embodiment, the diameter 'D1' of the mating portion 302 may be less than a diameter of the conduit 124 of each of the engaging portions 116, 118 to allow insertion of the mating portion 302 within the conduit 124.

Further, the mating portion 302 may include a circular groove 306 formed on an outer surface 302-1 of the mating portion 302. The mating portion 302 may be inserted within the conduit 124 of one of the engaging portions 116, 118 in a manner that the circular groove 306 may concentrically aligned with the inner surface 120-2 of one of the engaging portions 116, 118.

In an embodiment, the connector assembly 100 may include, but is not limited to, a sealing ring 201 (as shown in FIG. 2) adapted to be accommodated in the circular groove 306 of the mating portion 302. The sealing ring 201 may be adapted to abut the inner surface 120-2 of one of the engaging portions 116, 118 to form a seal. In particular, the mating portion 302 may be inserted within one of the engaging portions 116, 118 in a manner that the sealing ring 201 abuts the inner surface 120-2 to define the seal between the housing member 102 and one of the clamping members 104-1, 104-2.

Further, each of the clamping members 104-1, 104-2 may include, but is not limited to, an opening 202 (as shown in FIG. 2) extending from the mating portion 302 to the deformable portion 304. The opening 202 may be adapted to receive one of the first cable and the second cable, respectively, therethrough. The mating portion 302 may be inserted within the conduit 124 of one of the engaging portions 116, 118 in a manner that the opening 202 may coaxially be aligned with the passage 114 of the housing member 102 to allow insertion of one of the first cable and the second cable in the passage 114 through the opening 202.

Further, the deformable portion 304 of each of the clamping members 104-1, 104-2 may extend coaxially from the mating portion 302. The deformable portion 304 may be adapted to deformably clamp one of the first cable and the second cable. For instance, the deformable portion 304 of the first clamping member 104-1 may be adapted to clamp the first cable inserted in the housing member 102 from the first end 110. Similarly, the deformable portion 304 of the second clamping member 104-2 may be adapted to clamp the second cable inserted in the housing member 102 from the second end 112.

Referring to FIG. 4, in the illustrated embodiment, the deformable portion 304 may include, but is not limited to, a plurality of longitudinal tabs 308 extending from the flange portion. The plurality of longitudinal tabs 308 may be adapted to be elastically deformed in a radial direction by one of the pair of fastening members 106 to clamp one of the first cable and the second cable, respectively.

Further, the connector assembly 100 may include, but is not limited to, a first sealing grommet 206 and a second sealing grommet 208. The first sealing grommet 206 may be adapted to be inserted within the opening 202 of the first clamping member 104-1 and to coaxially align with the deformable portion 304 of the first clamping member 104-1. The second sealing grommet 208 may be adapted to be inserted within the opening 202 of the second clamping member 104-2 and to coaxially align with the deformable portion 304 of the second clamping member 104-2.

In an embodiment, each of the first sealing grommet 206 and the second sealing grommet 208 may include, but is not limited to, an outer surface 310 and an inner surface 312. The outer surface 310 may be adapted to abut the deformable portion 304 of one of the clamping members 104-1, 104-2. In particular, the outer surface 310 may be adapted to form a surface contact with the plurality of longitudinal tabs 308 of the deformable portion 304.

The first sealing grommet 206 and the second sealing grommet 208 may be adapted to be compressed by the plurality of longitudinal tabs 308 of the deformable portion 304 of the first clamping member 104-1 and the second clamping member 104-2, respectively, to define a seal around each of the first cable and the second cable.

Further, the inner surface 312 may be adapted to define an opening 314 adapted to receive one of the first cable and the second cable therethrough. In an embodiment, a diameter, interchangeably referred to as the inner diameter, of the opening 314 defined by the inner surface 312 may be varied based on an Outer Diameter (OD) of the cable to be inserted through such opening 314. In an embodiment, sealing grommets, such as the first sealing grommet 206 and the second sealing grommet 208, with different inner diameters may be implemented based on the OD of the cables to be inserted therethrough and spliced together.

Referring to FIG. 1, FIG. 2, and FIG. 3, the pair of fastening members 106 of the connector assembly 100 may include a first fastening member 106-1 and a second fastening member 106-2. The first fastening member 106-1 may be adapted to be disposed at the first end 110 of the housing member 102. The second fastening member 106-2 may be adapted to be disposed at the second end 112 of the housing member 102.

Each of the first fastening members 106-1 and the second fastening members 106-2 may include, but is not limited to, a first end 125-1, a second end 125-2 distal to the first end, and a passage defined between the first end 125-1 and the second end 125-2. The first end 125-1 may be provided with an opening 126 to receive one of the first cable and the second cable therethrough. The second end 125-2 may be adapted to be engaged with one of the first engaging portion 116 and the second engaging portion 118 of the housing member 202.

In an embodiment, each of the first fastening member 106-1 and the second fastening member 106-2 may include internal threads formed on an inner surface of each fastening members 106-1, 106-2. The fastening members 106-1, 106-2 may be adapted to be engaged with the plurality of threads 122 of the first engaging portion 116 and the second engaging portion 118, respectively.

The first fastening member 106-1 may be adapted to partially accommodate the first clamping member 104-1 and, to coaxially engage with the first engaging portion 116. The first fastening member 106-1 may be rotated with respect to the first engaging portion 116 to axially move on the first engaging portion 116 and to elastically deform the first clamping member 104-1 to clamp the first cable. In particular, the first fastening member 106-1 may be rotated to axially move on the plurality of threads 122 of the first engaging portion 116 and simultaneously, compressing the plurality of longitudinal tabs 308 of the first clamping member 104-1 to clamp the first cable.

The second fastening member 106-2 may be adapted to partially accommodate the second clamping member 104-2 and, to coaxially engage with the second engaging portion 118. The second fastening member 106-2 may be rotated with respect to the second engaging portion 118 to axially move on the second engaging portion 118 and to elastically deform the second clamping member 104-2 to clamp the second cable. In particular, the second fastening member 106-2 may be rotated to axially move on the plurality of threads 122 of the second engaging portion 118 and simultaneously, compressing the plurality of longitudinal tabs 308 of the second clamping member 104-2 to clamp the second cable.

Each of the first fastening member 106-1 and the second fastening member 106-2 may include a plurality of furrows 128 formed on an outer surface of each of the first fastening member 106-1 and the second fastening member 106-2. The plurality of furrows 128 may be adapted to enable gripping of each of the first fastening member 106-1 and the second fastening member 106-2. Further, the plurality of furrows 128 may allow gripping of a fastening tool to tighten each of the first fastening member 106-1 and the second fastening member 106-2 to the engaging portions 116, 118 the housing member 102. In an embodiment, the fastening tool may include, but is not limited to, a spanner, a wrench, and any other automated or manually operated fastening tool.

Figure 5:
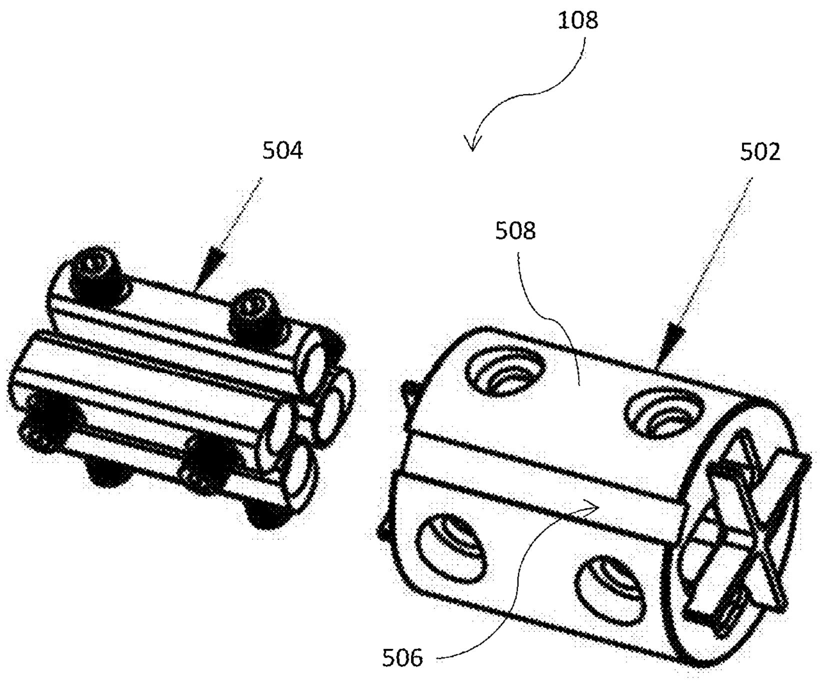
FIG. 5 illustrates an exploded view of a terminal block of the cable connector assembly, according to an embodiment of the present disclosure.

FIG. 5 illustrates an exploded view of the terminal block 108 of the connector assembly 100, according to an embodiment of the present disclosure. As explained earlier, the terminal block 108 may be adapted to be inserted and positioned within the passage 114 of the housing member 102. Referring to FIG. 5, the terminal block 108 may include, but is not limited to, a body 502 and a plurality of terminal contacts 504 adapted to be inserted within the body 502.

The body 502 may include, but is not limited to, a plurality of cavities (not shown) adapted to accommodate a plurality of terminal contacts 504 to electrically connect the first cable with the second cable. In an embodiment, an un-insulated portion of each of the first cable and the second cable may be fastened to the plurality of terminal contacts 504 via the fasteners, such as screws, to establish an electrical connection between the first cable and the second cable.

Further, the body 502 may include, but is not limited to, a stepped portion 506 formed on an outer surface 508 of the body 502. The stepped portion 506 may be adapted to restrict a rotational movement of the body 502, with respect to the housing member 102, within the passage 114 of the housing member 102. The body 502 may be inserted within the passage 114 through one of the first end 110 and the second end 112 of the housing member 102.

In one embodiment, the body 502 may be inserted through the first end 110 of the housing member 102. In such an embodiment, the first region 114-1 of the passage 114 may adjoin the first end 110 of the housing member 102 and the second region 114-2 of the passage 114 may adjoin the second end 112 of the housing member 102. Further, the seat 114-3 may be defined, within the passage 114, closer to the second end 112 of the housing member 102 to align the body 502 of the terminal block 108 at the central position of the housing member 102.

In the illustrated embodiment, referring to FIG. 3, the body 502 may be inserted through the second end 112 of the housing member 102. In such an embodiment, the first region 114-1 of the passage 114 may adjoin the first end 110 of the housing member 102, and the second region 114-2 of the housing member 102 may adjoin the second end 112 of the housing member 102. Further, the seat 114-3 may be defined, within the passage 114, closer to the first end 110 of the housing member 102 to align the body 502 of the terminal block 108 at the central position of the housing member 102.

In an embodiment, the body 502 may be inserted in the housing member 102 by axially aligning the stepped portion 506 with a gauge 130 formed on the housing member 102. Details of the gauge 130 are further explained in the subsequent sections of the present disclosure.

Figure 6A:
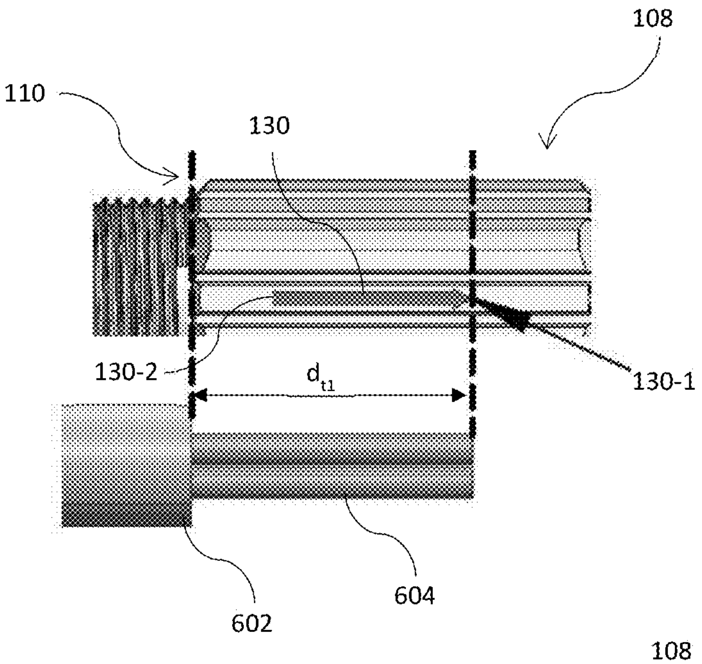
FIGS. 6*a* and 6*b* illustrate a gauge of the cable connector assembly, according to an embodiment of the present disclosure.
Figure 6B:
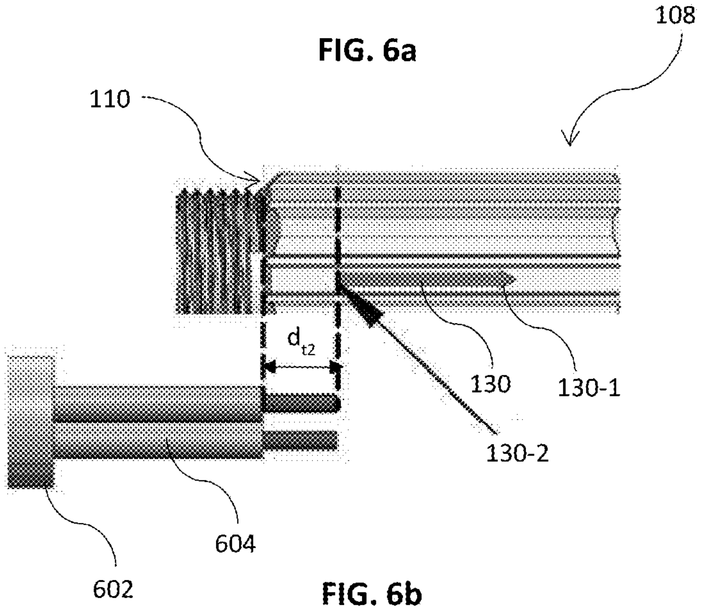

FIGS. 6*a* and 6*b* illustrate the gauge 130 of the connector assembly 100, according to an embodiment of the present disclosure. Referring to FIGS. 1, 2, 6*a* and 6*b*, the gauge 130 may be formed on the outer surface of the housing member 102 to indicate a length of a cable jacket 602 to be stripped from each of the first cable and the second cable. Referring to FIG. 6*a*, a distance '$d_{t1}$' of a tip 130-1 of the gauge 130 from the first end 110 of the housing member 102 may indicate the length of the cable jacket 602 to be stripped from each of the first cable and the second cable for electrically connecting the first cable with the second cable via the terminal block 108. In an example, the length of the cable jacket 602 to be stripped may be in a range of 40.05 mm to 39.95 mm.

Further, the gauge 130 may indicate a length of a cable insulation 604 to be stripped from each of the first cable and the second cable to electrically connect one of the first cable and the second cable with the terminal block 108. Referring to FIG. 6*b*, a distance '$d_{t2}$' of a tail 130-2 of the gauge 130 from the first end 110 of the housing member 102 may indicate the length of the cable insulation 604 to be stripped from one of the first cable and the second cable for electrically connecting the first cable with the second cable via the terminal block 108. In an example, the length of the cable insulation 604 to be stripped may be in a range of 11.75 mm to 11.65 mm.

As explained earlier, the body 502 of the terminal block 108 may be adapted to be inserted within the passage 114 through one of the first end 110 and the second end 112 of the housing member 102. In an embodiment, the gauge 130 may indicate one of the first end 110 and the second end 112 through which the terminal block 108 to be inserted within the passage 114 of the housing member 102.

In an embodiment, the gauge 130 may be provided with an arrowhead, at the tip 130-1 of the gauge 130, indicating a direction of insertion of the body 502 within the passage 114 of the housing member 102 through one of the first end 110 and the second end 112. For instance, referring to FIG. 1, the arrowhead of the gauge 130 may indicate that the body 502 of the terminal block 108 is to be inserted within the passage 114 from the second end 112 of the housing member 102.

In an embodiment, dimensional characteristics, such as a length, of the gauge 130 may vary based on an overall size of the connector assembly 100 and diameters of the cables to be connected using the connector assembly 100.

Figure 7A:
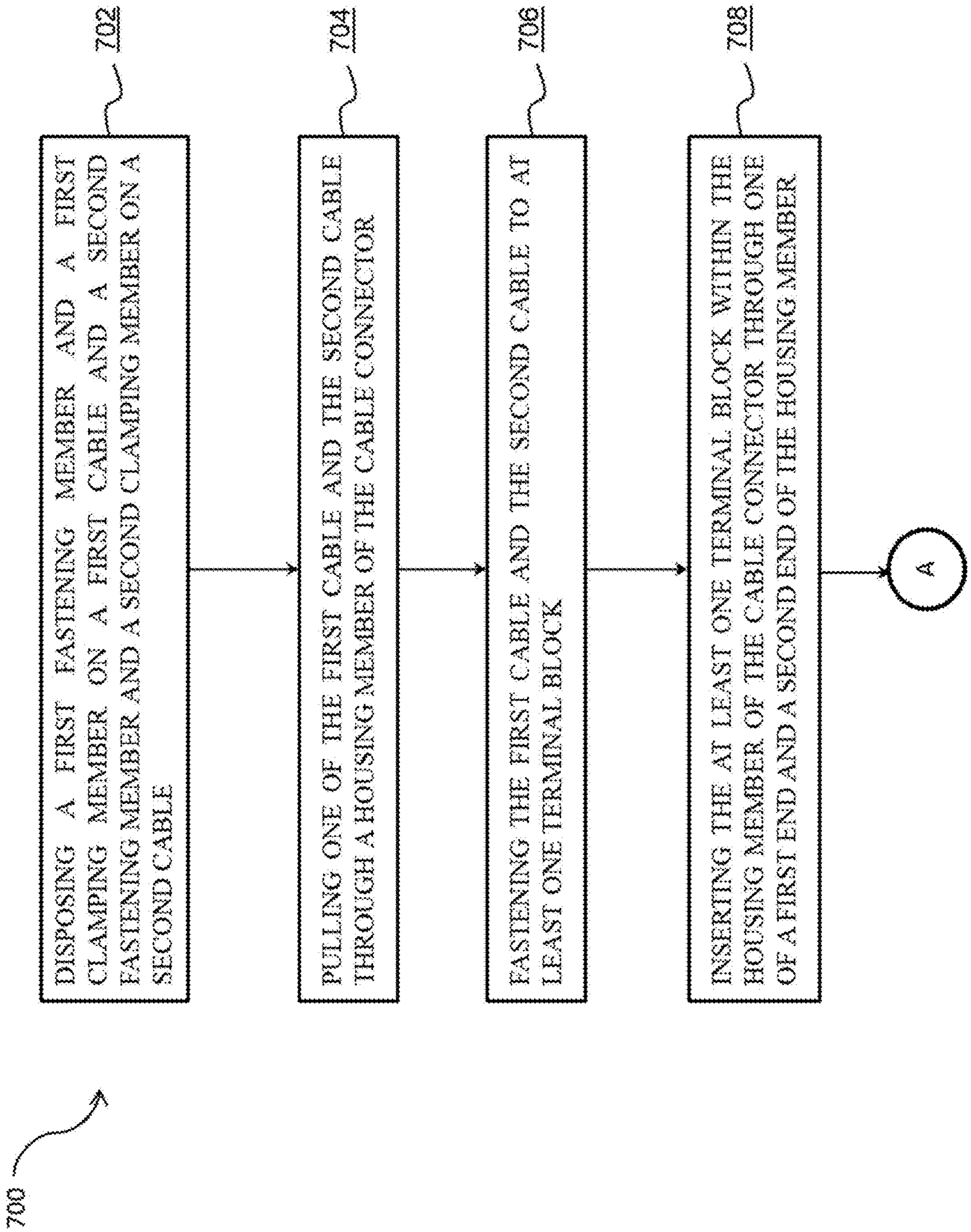
FIGS. 7*a*-7*b* illustrates a flowchart depicting a method for assembling the cable connector assembly, according to an embodiment of the present disclosure.
Figure 7B:
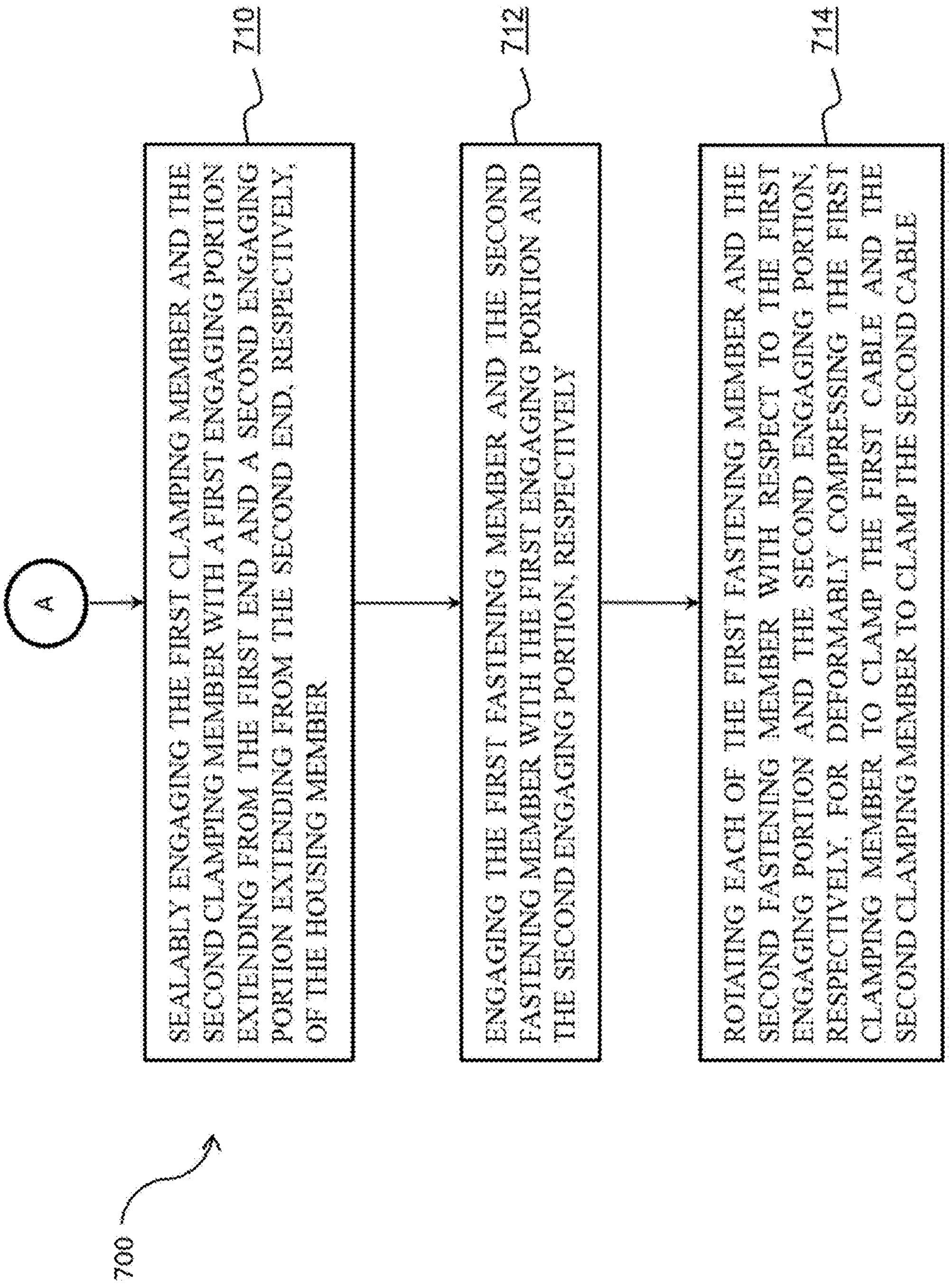
Figure 8A:
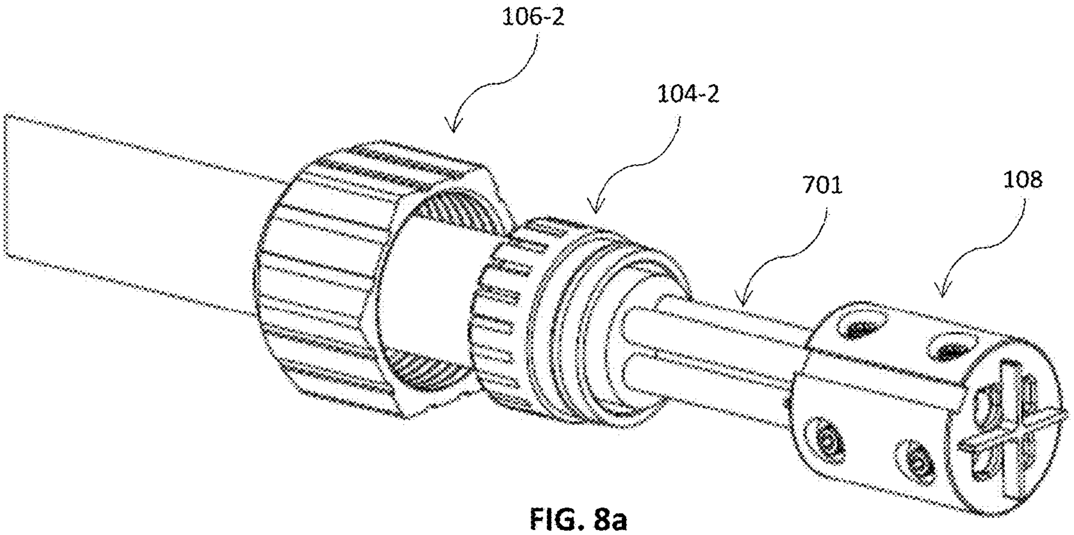
FIGS. 8*a*-8*d* illustrate steps of the method for assembling the cable connector assembly, according to an embodiment of the present disclosure.
Figure 8B:
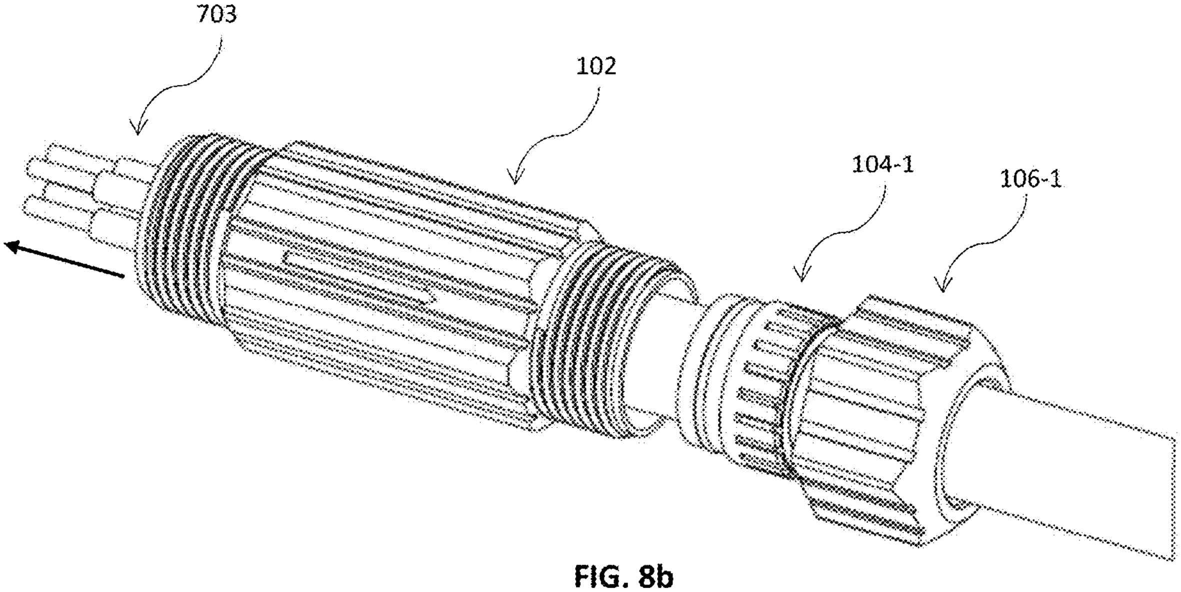
Figure 8C:
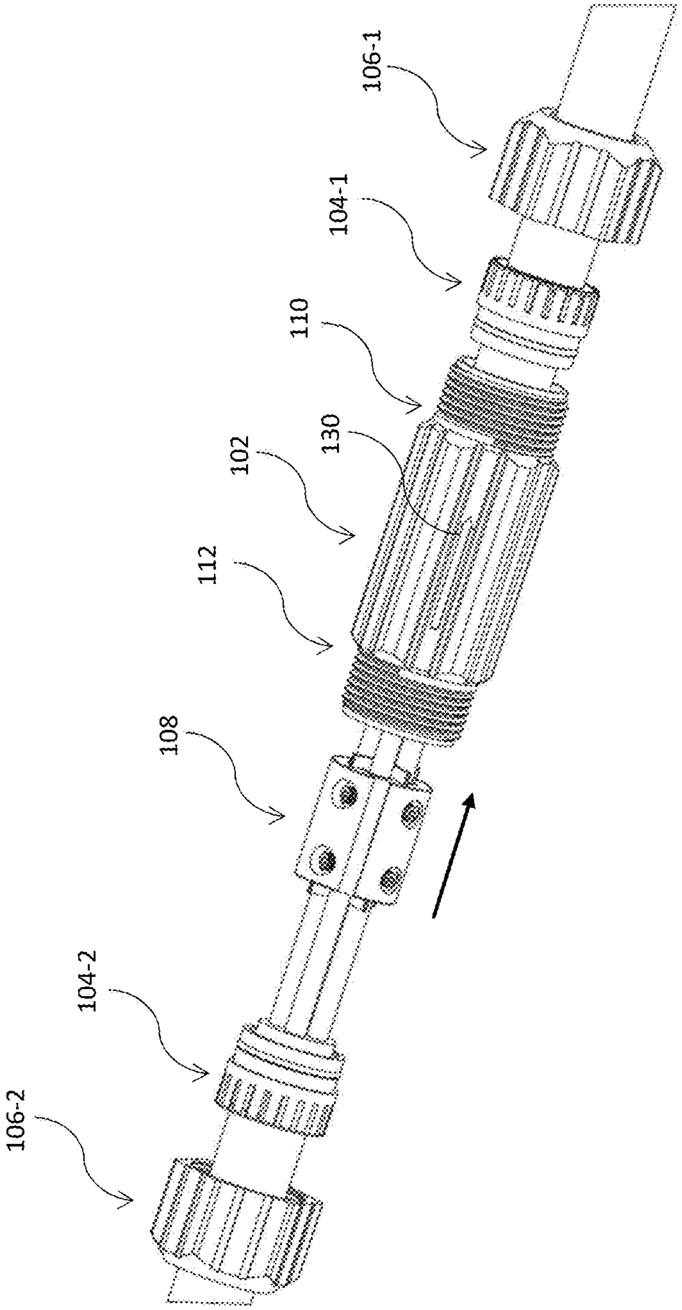
Figure 8D:
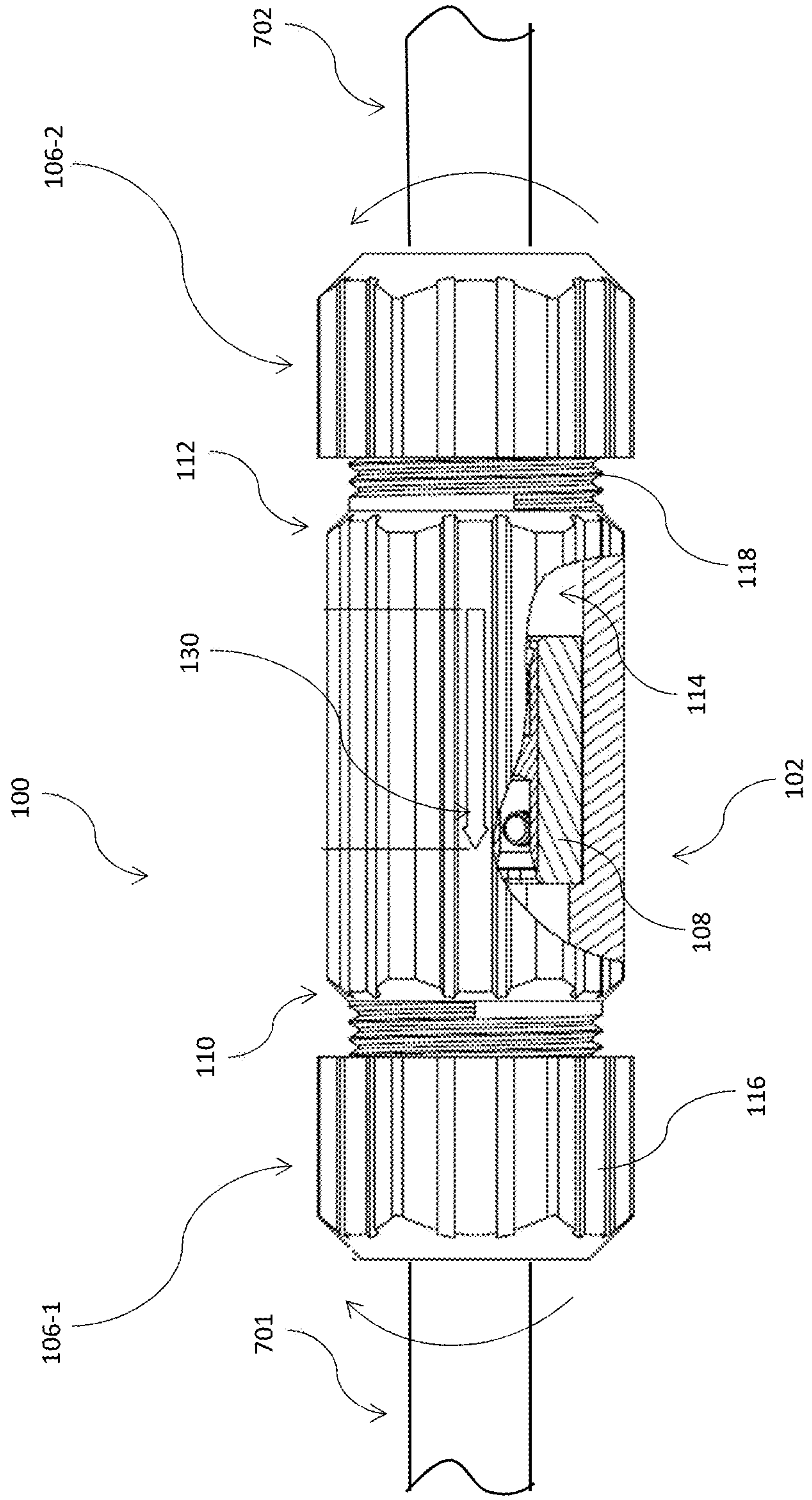

FIGS. 7*a*-7*b* illustrates a flowchart depicting a method 700 for assembling the connector assembly 100, according to an embodiment of the present disclosure. FIGS. 8*a*-8*c* illustrate steps of the method 700 for assembling the connector assembly 100, according to an embodiment of the present disclosure. The method 700 may be performed for assembling the connector assembly 100. For the sake of brevity, features of the connector assembly 100 that are already explained in detail in the description of FIG. 1, FIGS. 2, FIG. 3, FIGS. 4, FIG. 5, and FIGS. 6*a*-6*b* are not explained in detail in the description of FIGS. 7*a*-7*b* and 8*a*-8*d*.

Initially, the first cable, such as a first cable 701, and the second cable, such as a second cable 703, may be prepared by using the gauge for splicing. As explained earlier, predefined lengths of the cable jacket 602 and the cable insulation 604 of each of the cables may be stripped for splicing. In an embodiment, the cable jacket 602 and the cable insulation 604 may be stripped from each of the first cable 701 and the second cable 703 by using a cable stripping tool and a wire stripping tool, respectively. The predefined length of each of the cable jacket and the cable insulation may be determined based on the gauge 130 formed on the housing member 102.

Referring to FIGS. 7*a*-7*b*, 8*a*, and 8*b*, at step 702, the method 700 includes disposing the first fastening member 106-1 and the first clamping member 104-1 on the first cable 701 and the second fastening member 106-2 and the second clamping member 104-2 on the second cable 703. Further, at step 704, the method 700 includes pulling one of the first cable 701 and the second cable 703 through the housing member 102 of the cable connector 100. In the illustrated embodiment, the first cable 701 may be pulled through the housing member 102 in a manner that the first clamping member 104-1 and the first fastening member 106-1 align at the first end 110 of the housing member 102.

Referring to FIGS. 7*a*-7*b* and FIG. 8*c*, at step 706, the method 700 includes fastening the first cable 701 and the second cable 703 to the terminal block 108. In the illustrated embodiment, firstly, the second cable 703 may be fastened to the terminal block 108. Thereafter, the first cable 701, pulled through the housing member 102, may be fastened to the terminal block 108 to establish the electrical connection between the first cable 701 and the second cable 703.

Referring to FIGS. 7*a*-7*b*, FIG. 8*c*, and FIG. 8*d*, the terminal block 108 may be oriented with respect to the gauge 130 in a manner that the stepped portion 506 of the terminal block 108 axially aligns with the gauge 130 formed on the housing member 102. Further, at step 708, the method 700 includes inserting the terminal block 108 within the housing member 102 of the cable connector 100 through one of the first end 110 and the second end 112 of the housing member 102. As explained earlier, the terminal block 108 may be inserted within the housing member 102 based on the direction of insertion indicated by the gauge 130. In the illustrated embodiment, the terminal block 108 may be inserted with the housing member 102 through the second end 112.

Further, at step 710, the method 700 includes sealably engaging the first clamping member 104-1 and the second clamping member 104-2 with the first engaging portion 116 extending from the first end 110 and the second engaging portion 118 extending from the second end 112, respectively, of the housing member 102. Furthermore, at step 712, the method 700 includes engaging the first fastening member 106-1 and the second fastening member 106-2 with the first engaging portion 116 and the second engaging portion 118, respectively.

Subsequently, at step 714, the method 700 includes rotating each of the first fastening member 106-1 and the second fastening member 106-2 with respect to the first engaging portion 116 and the second engaging portion 118, respectively, for deformably compressing the first clamping member 104-1 to clamp the first cable and the second clamping member 104-2 to clamp the second cable. Each of the first fastening member 106-1 and the second fastening member 106-2 may be rotated until the fastening members 106-1, 106-2 is tightly fastened to each of the first engaging portion 116 and the second engaging portion 118 of the housing member 102.

As would be gathered, the present disclosure offers the cable connector assembly 100 and the method 700 for assembling the cable connector assembly 100. The connector assembly 100 may be employed in various applications, such as refrigeration containers, for connecting cables with different dimensional characteristics, such as the Outer Diameter (OD). The connector assembly 100 has a wide range of applications. In an example, the connector assembly 100 may be employed for connecting cables having an OD in a range of 11 mm to 20 mm. Therefore, the connector assembly 100 can also be employed for connecting cables with larger ODs. Dimensional characteristics, such as a size of the housing member 102 and other sub-components, of the connector assembly 100 can be scaled-up based on the OD of the cables to be connected and/or known wire gauge standards, such as American Wire Gauge (AWG), without altering any constructional and operational characteristics, as explained in the present disclosure, of the connector assembly 100.

Further, as explained earlier, the connector assembly 100 includes the housing member 102, the pair of clamping members 104, and the pair of fastening members 106. Compared to conventional connector assemblies, the connector assembly 100 includes a substantially lesser number of components. For instance, the first engaging portion 116 and the second engaging portion 118 of the housing member 102 eliminate the requirement of having separate components to connect the clamping members 104 and the fastening members 106 to the housing member 102.

As mentioned earlier, the housing member 102 with the engaging portions 116, 118 may be formed as an integral component by the manufacturing process, such as the injection molding process. This substantially reduces the overall cost of manufacturing of the connector assembly 100. Also, integration of the engaging portions 116, 118 with the housing member 102 results in substantial reduction in the overall length of the connector assembly 100 and material requirement for manufacturing the connector assembly 100. For example, the overall length and the material requirement of the connector assembly 100 may be reduced by approximately 30% compared to the conventional connector assemblies. Further, owing to the reduction in the number of sub-components, the overall weight of the connector assembly 100 is substantially reduced compared to the conventional connector assemblies.

Therefore, the cable connector assembly 100 of the present disclosure is compact, efficient, durable, flexible in implementation, cost-effective, light-weight, and convenient.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A cable connector assembly comprising:

a housing member having a first end and a second end defining a passage therebetween, the housing member comprising a first engaging portion and a second engaging portion coaxially extending from the first end and the second end, respectively, wherein the housing member is adapted to accommodate at least one terminal block to electrically connect a first cable and a second cable;

a first clamping member adapted to be partially inserted in the first engaging portion of the housing member and to coaxially align with the passage to accommodate insertion of the first cable therein, wherein the first clamping member is adapted to elastically deform to clamp the first cable;

a second clamping member adapted to be partially inserted in the second engaging portion of the housing member and to coaxially align with the passage to accommodate insertion of the second cable therein, wherein the second clamping member is adapted to elastically deform to clamp the second cable;

a first fastening member adapted to partially accommodate the first clamping member and to coaxially engage with the first engaging portion, wherein the first fastening member is rotated with respect to the first engaging portion to axially move on the first engaging portion and to elastically deform the first clamping member to clamp the first cable; and a second fastening member adapted to partially accommodate the second clamping member and to coaxially engage with the second engaging portion, wherein the second fastening member is rotated with respect to the second engaging portion to axially move on the second engaging portion and to elastically deform the second clamping member to clamp the second cable.

2. The cable connector assembly according to claim 1, wherein an outer surface of each of the first engaging portion and the second engaging portion comprises a plurality of threads adapted to be engaged with internal threads of one of the first fastening member and the second fastening member, respectively.

3. The cable connector assembly according to claim 1, wherein each of the first clamping member and the second clamping member comprises:

a mating portion adapted to be inserted within one of the first engaging portion and the second engaging portion; and a deformable portion extending coaxially from the mating portion and adapted to deformably clamp one of the first cable and the second cable, wherein a diameter of the mating portion is less than a diameter of the deformable portion.

4. The cable connector assembly according to claim 3 comprising a sealing ring adapted to be accommodated in a circular groove formed on an outer surface of the mating portion.

5. The cable connector assembly according to claim 4, wherein the mating portion is inserted within one of the first engaging portion and the second engaging portion in a manner that the sealing ring abuts an inner surface of one of the first engaging portion and the second engaging portion to define a seal between the housing member and one of the first clamping member and the second clamping member.

6. The cable connector assembly according to claim 3, wherein the deformable portion comprises a plurality of longitudinal tabs adapted to be elastically deformed in a radial direction by one of the first fastening member and the second fastening member to clamp one of the first cable and the second cable, respectively.

7. The cable connector assembly according to claim 3, wherein each of the first clamping member and the second clamping member comprises an opening extending from the mating portion to the deformable portion and adapted to receive one of the first cable and the second cable, respectively, therethrough.

8. The cable connector assembly according to claim 1, comprising:

a first sealing grommet adapted to be inserted within the opening of the first clamping member and to coaxially align with the deformable portion of the first clamping member; and a second sealing grommet adapted to be inserted within the opening of the second clamping member and to coaxially align with the deformable portion of the second clamping member.

9. The cable connector assembly according to claim 8, wherein each of the first sealing grommet and the second sealing grommet comprises:

an outer surface adapted to abut the deformable portion; and an inner surface defining an opening adapted to receive one of the first cable and the second cable therethrough.

10. The cable connector assembly according to claim 8, wherein the first sealing grommet and the second sealing grommet are adapted to be compressed by a plurality of longitudinal tabs of the deformable portion of the first clamping member and the second clamping member, respectively, to define a seal around each of the first cable and the second cable.

11. The cable connector assembly according to claim 1, wherein each of the first fastening member and the second fastening member comprises a plurality of furrows formed on an outer surface of each of the first fastening member and the second fastening member.

12. The cable connector assembly according to claim 11, wherein the plurality of furrows is adapted to enable gripping of each of the first fastening member and the second fastening member, and to allow gripping of a fastening tool to tighten each of the first fastening member and the second fastening member to the housing member.

13. The cable connector assembly according to claim 1, wherein the at least one terminal block comprises a body having a plurality of cavities adapted to accommodate a plurality of terminal contacts to electrically connect the first cable with the second cable.

14. The cable connector assembly according to claim 13, wherein the body comprises a stepped portion formed on an outer surface of the body, and is adapted to restrict a rotational movement of the body, with respect to the housing member, within the passage of the housing member, the body is adapted to be inserted in the housing member by aligning the stepped portion with a gauge formed on the housing member.

15. The cable connector assembly according to claim 14, wherein the gauge is formed on an outer surface of the housing member to indicate:

a length of a cable jacket to be stripped from each of the first cable and the second cable, a length of a cable insulation to be stripped from each of the first cable and the second cable to electrically connect one of the first cable and the second cable with the at least one terminal block, and one of the first end and the second end through which the at least one terminal block to be inserted within the passage of the housing member.

16. The cable connector assembly according claim 15, wherein:

a distance of a tip of the gauge from the first end of the housing member indicates the length of the cable jacket to be stripped from each of the first cable and the second cable for electrically connecting the first cable with the second cable via the at least one terminal block, and a distance of a tail of the gauge from the first end of the housing member indicates the length of the cable insulation to be stripped from one of the first cable and the second cable for electrically connecting the first cable with the second cable via the at least one terminal block.

17. The cable connector assembly according to claim 15, wherein the passage of the housing member comprises:

a first region adapted to receive the at least one terminal block through one of the first end and the second end, and a second region coaxial with respect to the first region, wherein an inner diameter of the first region is greater than an inner diameter of the second region.

18. The cable connector assembly according to claim 17, wherein a seat is defined between the first region and the second region, the seat is adapted to abut and axially align the at least one terminal block at a central position within the passage to restrict ingress of the at least one terminal block within the second region.

19. A method of assembling a cable connector, the method comprising:

disposing a first fastening member and a first clamping member on a first cable and a second fastening member and a second clamping member on a second cable;

pulling one of the first cable and the second cable through a housing member of the cable connector;

fastening the first cable and the second cable to at least one terminal block;

inserting the at least one terminal block within the housing member of the cable connector through one of a first end and a second end of the housing member;

sealably engaging the first clamping member and the second clamping member with a first engaging portion extending from the first end and a second engaging portion extending from the second end, respectively, of the housing member;

engaging the first fastening member and the second fastening member with the first engaging portion and the second engaging portion, respectively; and rotating each of the first fastening member and the second fastening member with respect to the first engaging portion and the second engaging portion, respectively, for deformably compressing the first clamping member to clamp the first cable and the second clamping member to clamp the second cable.

20. A cable connector assembly comprising:

a housing member comprising a first engaging portion and a second engaging portion extending from a first end and a second end;

a first clamping member adapted to be partially inserted in the first engaging portion of the housing member and a second clamping member adapted to be partially inserted in the second engaging portion of the housing member, wherein the first clamping member and the second clamping member further comprise a deformable portion comprising a plurality of longitudinal tabs adapted to be elastically deformed in a radial direction;

a first fastening member adapted to engage with the first engaging portion, wherein the first fastening member is configured to partially accommodate the first clamping member and elastically deform the first clamping member to clamp the first cable; and a second fastening member to engage with the second engaging portion, wherein the second fastening member is configured to partially accommodate the second clamping member and to elastically deform the second clamping member to clamp the second cable.

* * * * *